United States Patent [19]

Park

[11] Patent Number: 5,667,451

[45] Date of Patent: Sep. 16, 1997

[54] POWER TRAIN OF AUTOMATIC TRANSMISSION FOR VEHICLE

[75] Inventor: Dong-Hoon Park, Kyungki-do, Rep. of Korea

[73] Assignee: Hyundai Motor Company, Seoul, Rep. of Korea

[21] Appl. No.: 417,024

[22] Filed: Apr. 5, 1995

[30] Foreign Application Priority Data

Apr. 8, 1994 [KR] Rep. of Korea ............. 94-7338

[51] Int. Cl.[6] ........................................ F16H 47/08
[52] U.S. Cl. ........................ 475/44; 475/46; 475/276; 475/279
[58] Field of Search ..................... 475/44, 275, 276, 475/279, 286, 287, 290, 291, 36, 39, 43, 46

[56] References Cited

U.S. PATENT DOCUMENTS

| | | | |
|---|---|---|---|
| 2,572,007 | 10/1951 | Burnett | 475/44 |
| 2,971,385 | 2/1961 | Miller | 475/279 X |
| 3,033,333 | 5/1962 | Breting et al. | 475/279 X |
| 3,078,740 | 2/1963 | Jandasek | 475/275 X |
| 3,270,585 | 9/1966 | Livezey | 475/46 |
| 3,371,555 | 3/1968 | Tuck et al. | 475/44 |
| 4,776,240 | 10/1988 | Miki | 477/144 X |
| 5,334,117 | 8/1994 | Ito | 475/276 |

FOREIGN PATENT DOCUMENTS

| | | | |
|---|---|---|---|
| 3713989 | 11/1987 | Germany | 475/44 |
| 4102493 | 7/1992 | Germany | 475/275 |
| 4-248048 | 9/1992 | Japan | 475/276 |

OTHER PUBLICATIONS

"Type of Three-Member Hydrodynamic Unit" by J. W. Qualman and E. L. Egbert, Hydra-Matic Div., General Motors Corp., pp. 198-200, from Publication—Design Practice/Passenger Car Automatic Transmission, 2nd edition, published by the Society of Automotive Engineering. (No Date Given).

Primary Examiner—Khoi Q. Ta

[57] ABSTRACT

A power train of an automatic transmission for a vehicle includes a fluid torque converter receiving power from the engine and a first brake for locking a second ring gear of a first speed changing part so that the output of a second sun gear receiving power from a turbine of the torque converter becomes the first forward speed. A second clutch is provided for transmitting power of a stator in the torque converter to a transfer drive gear in addition to the first speed level so that the speed is automatically and continuously changed form the time that power of the torque converter is reduced since the power of the torque converter is transmitted to the stator. A first clutch is provided for performing the fixing mode of the second speed level such that the output power of the first speed changing part is the same as the input power of the engine, because the output of the engine is directly transmitted to the first ring gear of the first speed changing part through the first clutch. A third brake locks a third ring gear so that the third ring gear functions as a reaction element in order to output the reduced speed at the mode of the first speed level, the mode of continuous speed changing and the fixing mode of second speed, respectively. A third clutch connects the first speed changing part with the second speed changing part in order to output the third speed level. The automatic transmission is capable of increasing the fuel ratio and its capacity by maximizing the efficiency of the power transmission and being simple in its construction.

18 Claims, 11 Drawing Sheets

FIG. 6

| RANGE | | B1 | B2 | C1 | C2 | C3 | B3 | ENGINE BRAKE | F2 |
|---|---|---|---|---|---|---|---|---|---|
| P | | | | | | | | | |
| R | | | ○ | | | | ○ | ○ | |
| N | | | | | | | | | |
| D | 1 | ○ | | | | | | | ○ |
| D | CV | ○ | | | ○ | | | | ○ |
| D | 2 | | | | ○ | | | | ○ |
| D | 3 | | | ○ | ○ | ○ | | ○ | |
| III | 1 | ○ | | | | | | | ○ |
| III | CV | ○ | | | ○ | | | | ○ |
| III | 2 | | | ○ | ○ | | ○ | ○ | ○ |
| II | 1 | ○ | | | | | | | ○ |
| II | CV | ○ | | | ○ | | ○ | ○ | ○ |
| L | 1 | ○ | | | | | ○ | ○ | ○ |
| HOLD MODE | | ○ | | | | ○ | | ○ | ○ |

POWER TRAIN OF AUTOMATIC TRANSMISSION FOR VEHICLE

BACKGROUND OF THE INVENTION

1. Field of the Invention

This invention relates to an automatic transmission for a vehicle, and more particularly to a power train of an automatic transmission for a vehicle which can increase fuel efficiency by improving an efficiency of power transmission in a high speed range, and can increase a feeling of smooth transmission by continuously being changed a low speed range.

2. Description of Related Art

Generally, an automatic transmission includes a transmission control unit which automatically controls the ratio of speed change according to a speed of the vehicle and load applied to the vehicle.

The transmission control unit controls the RPM of an output end of a planet gear set by operating or releasing a plurality of clutches and brakes provided in the control unit.

Practically, to design a gear train which outputs forward speed and backward speed, at least one multiplanet gear set and a plurality of operating elements must be provided. And to design a gear train which smoothly changes speed, at least one multiplanet gear set, seven operating elements and three one-way clutches must be provided.

A gear train having the several elements, however, is complicated in its construction and a weight of the gear train is increased.

Since the prior automatic transmission has limited the speed changing steps, a shock occurs upon changing speed and the range for operating the engine is limited within some steps. Fuel ratio is lowered and power of the engine cannot be used in its best capacity.

Since in a low speed range, input torque is high and speed must be frequently changed and in a high speed range planet gears are not directly connected to the crank shaft of the engine, the efficiency of power transmission is decreased.

To solve the above problems, an automatic transmission having a mechanism in which a turbine of a fluid torque converter is directly connected to the input shaft of a planet gear assembly in an automatic transmission is disclosed in U.S. Pat. No. 4,776,240 issued to Aisin.

In the automatic transmission according to the Aisin patent, however, as mentioned above, seven operating elements and three one-way clutches must be provided, and changing speed is not continuously performed according to the conditions of a vehicle. Therefore the above problems are not perfectly solved.

SUMMARY OF THE INVENTION

The principle object of the invention is to provide a power train of an automatic transmission which can minimize the shock occurring during a speed change by enabling the changing speed to be automatically and continuously performed in the low speed range of which operating time is short.

It is another object of the invention to provide a power train of an automatic transmission which can increase the fuel ratio by maximizing the efficiency of the power transmission.

It is a further object of the invention to provide a power train of an automatic transmission which is simple in its construction and can increase its capacity.

To accomplish the above objects, the present invention includes: a fluid torque converter receiving power from the engine; a first brake for locking the second ring gear of a first changing speed part so that the output of a second sun gear receiving power from a turbine of the torque converter becomes the first forward speed; a second clutch for transmitting power of the stator in the torque converter to a transfer drive gear in addition to the first speed level so as to automatically and continuously change speed from a time that power of the torque converter is reduced since the power of the torque converter is transmitted to the stator; a first clutch for performing a fixing mode of the second speed level such that the output power of the first speed changing part is the same as the input power of the engine, because the output of the engine is directly transmitted to the first ring gear of the first speed changing part through the first clutch; a third brake which locks the third ring gear so that the third ring gear functions as a reaction element in order to output the reduced speed at the mode of a first speed level, the mode of continuous speed changing and the fixing mode of a second speed, respectively; and a third clutch connecting the first speed changing part with the second speed changing part in order to output the third speed level.

Many objects and advantages of the present invention will become apparent to those skilled in the art when the following description of an example of the best mode contemplated at the present for practicing the invention is read in connection with the accompanying drawings wherein like reference numerals refer to like or equivalent parts, and in which:

BRIEF DESCRIPTION OF THE DRAWINGS

FIG. 6 is a table showing the operating condition of the clutches and the brakes relative to the position of the change gear;

DETAILED DESCRIPTION OF THE PREFERRED EMBODIMENTS

Figure 1:
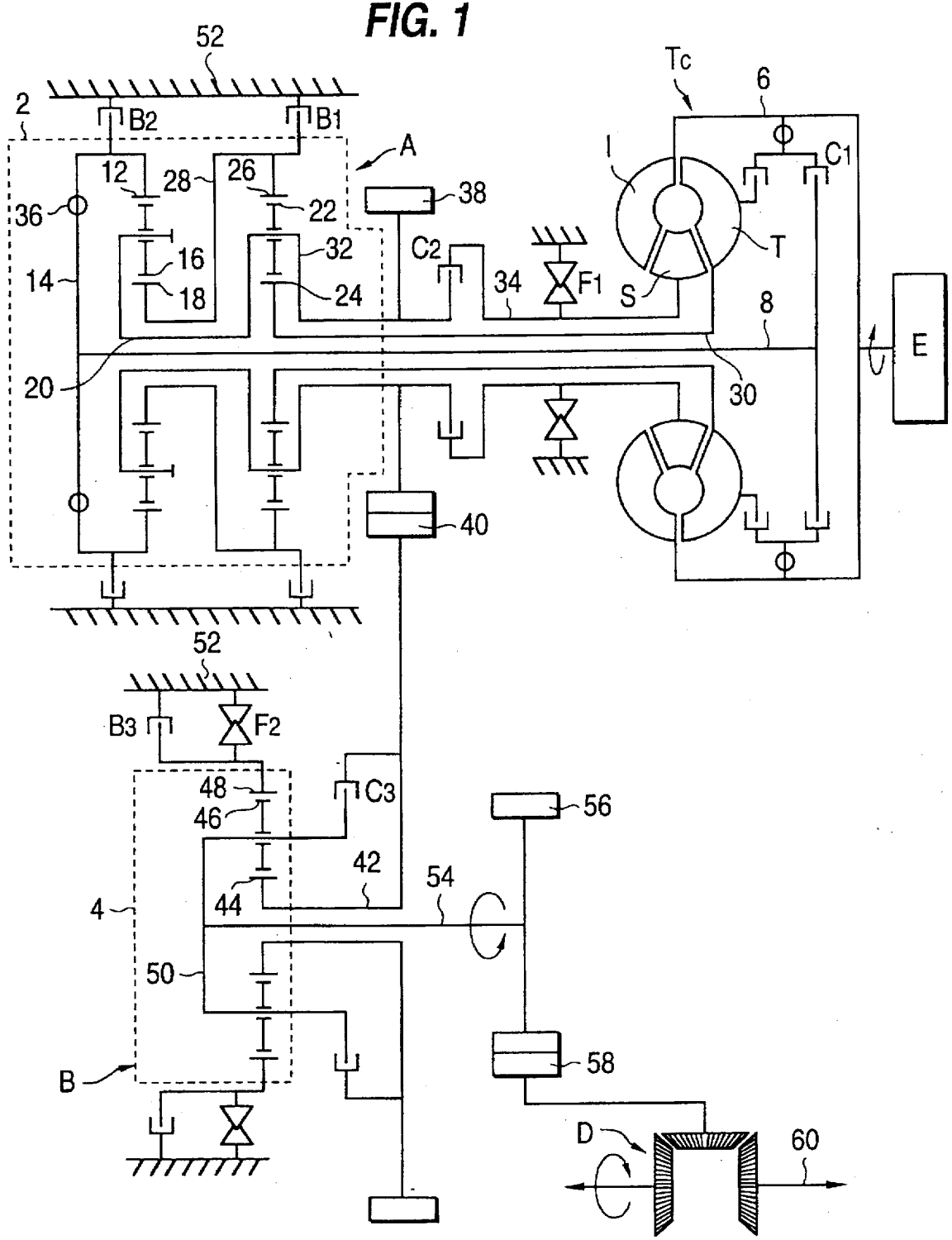
FIG. 1 is a schematic illustration of an automatic transmission in accordance with the first embodiment of the present invention.

FIG. 1 schematically shows the inner construction of a power train of an automatic transmission according to the principal embodiment of the present invention. The automatic transmission comprises a torque converter TC revolved by the power from the output shaft of an engine E, a first speed changing part A having a multiplanet gear device 2 which reduces the speed transferred from the torque converter TC with a proper ratio of reduction speed, and a second speed changing part B having a single planet gear device 4 which reduces the speed transferred from the first speed changing part B.

The torque converter TC includes an impeller I directly connected to the crank shaft of the engine E and receives the power from the engine E, the turbine T arranged opposite to the impeller I and revolved by the rotating force of the oil flowing from the impeller I, and the stator S arranged between the impeller I and the turbine T and turning the flowing direction of the oil from the impeller I to the other direction so as to increase revolution force of the oil.

The torque converter TC can be comprised of a similar construction as that disclosed in U.S. Pat. No. 3,613,479.

The impeller I is connected with the engine E through a shell cover 6. A first clutch C1 is installed within the shell cover and transmits the power from the engine E to a first shaft 8 of the first speed changing part A.

The first shaft 8 is connected with a first ring gear 12 through a hub 14 of the first shaft 8, a first pinion gear 16 is engaged with the inside of the first ring gear 12, and the first pinion gear 16 is meshed with a first sun gear 18 so that the power can be transmitted from the first shaft 8 to the first sun gear 18.

The first pinion gear 16 is meshed with a second pinion gear 22 through a first power transmitting member 20, the second pinion gear 22 is meshed with a second sun gear 24 so that the power from the first pinion gear 16 can be transmitted to the second sun gear 24.

The second pinion gear 22 is meshed with a second ring gear 26, which is meshed with the first sun gear 18 through a second power transmitting member 28. The second power transmitting member 28 is connected to a first brake B1, which is installed in the inside of a transmission case 52 and selectively locks the second power transmitting member 28 so that the first sun gear 18 and the second ring gear 26 can function as reaction elements.

The hub 14 is connected to a second brake B2 which is mounted on the transmission case 52 and selectively locks the hub 14 so that the first ring gear 12 connected with the hub 14 can function as a reaction element.

Therefore, when the second sun gear 24 is operated as an input element, the first power transmitting member 20 is rotated counterclockwise when viewing from the engine side, that is, the rotating direction of the first power transmitting member 20 is opposite in direction to that of the engine E.

The second sun gear 24 is connected with the turbine T through a third power transmitting member 30 so that the power from the turbine T is transmitted to the second sun gear 24, the first power transmitting member 20 is connected with the torque converter TC through a fourth power transmitting member 32, a second clutch C2 and a fifth power transmitting member 34. The fourth power transmitting member 32 is connected with the second pinion gear 22, and the fifth power transmitting member 34 is connected with the fourth power transmitting member 32 through the second clutch C2. Therefore when the second clutch C2 is operated, the power of the stator S is transmitted to the first power transmitting member 20.

The fifth power transmitting member 34 is connected with the second clutch C2 in order to lock the rotation of the fifth power transmitting member 34 in a counterclockwise direction.

When the first clutch C1 is operated and the first shaft 8 is directly connected with the engine E, only minimal shock can occur. In order to reduce the shock, it is preferred to install a damper 36 between the hub 14 and the first ring gear 12.

A transfer driving gear 38 is mounted on the fourth power transmitting member 32 so that the reduced power in the first speed changing part A is transferred to a transfer driven gear 40. The transfer driven gear 40 is connected with a sixth power transmitting member 42 in the second speed changing part B and the reduced power is transmitted to a third sun gear 44 in the single planet gear device 4 through the sixth power transmitting member 42.

The third sun gear 44 is meshed with a third pinion gear 46 of the single planet gear device 4, which is engaged with the inside of a third ring gear 48. The third pinion gear 46 is composed of a plurality of pinion gears, which are connected with a planet carrier 50, the opposite side of the planet carrier 50 which is projected from the third pinion gear 46 is connected with a third clutch C3 so that the planet carrier 50 is selectively connected with the transfer driven gear 40 through the third clutch C3. Therefore the single planet gear device 4 can have two input elements which comprise the third clutch C3 and the sixth power transmitting element 42.

The third ring gear 48 functions as a reaction element, when a third brake B3 mounted on the transmission case 52 is operated, and the third ring gear 48 is also connected with a second one-way clutch F2 which is mounted on the transmission case 52 and locks the reverse rotation against a first one-way clutch F1.

The planet carrier 50 is connected with a second shaft 54, on the end of which a final drive gear 56 is mounted, and the final drive gear 56 is connected with a final reduction gear 58 which transfers the finally reduced power to a differential device D so as to drive an axle shaft 60 of a car.

As described above, when the engine is operated, the impeller I of the torque converter TC connected through the shell cover 6 to the output shaft of the engine E is rotated. Rotating force of the impeller I blows out the oil in the torque converter TC toward the turbine T and rotates it. Then the rotating force of the turbine T is transmitted to the second sun gear 24 of the multiplanet gear device 2 through the third power transmitting member 30.

At this time, the stator S in the torque converter TC will reversely rotate against the rotating direction of the output of the engine E, the movement of the stator S however is restrained by the first one-way clutch F1. As a result, the torque converter TC increases the torque from the engine E.

At this state, when the running speed of the car is increased and the torque converter TC reaches a coupling state, the stator S is rotated in the same direction as the rotating direction of the engine E and begins free wheeling.

The torque from the turbine T to the third power transmission member 30 turns the second sun gear 24 engaged with the second pinion gear 22, and the second pinion gear 22 is rotated in a counterclockwise direction when viewing the engine E.

Then, as shown in FIG. 6, when the manual operation of the shift lever is at the "N" speed range or the "P" speed range, since operating elements are not operated, the power from the engine E is not transmitted to any other operating members.

When the manual operation of the shift lever is at the "D" speed range, the first brake B1 of the first transmission part A is operated by the control unit of the transmission, and locks the first sun gear 18 and the second ring gear 26 in the multiple planet gear assembly 2. Then, the second sun gear 24 functions as an input element, the second ring gear 26 functions as a reaction element and the second power transmission member 32 functions as an output element.

Figure 4:
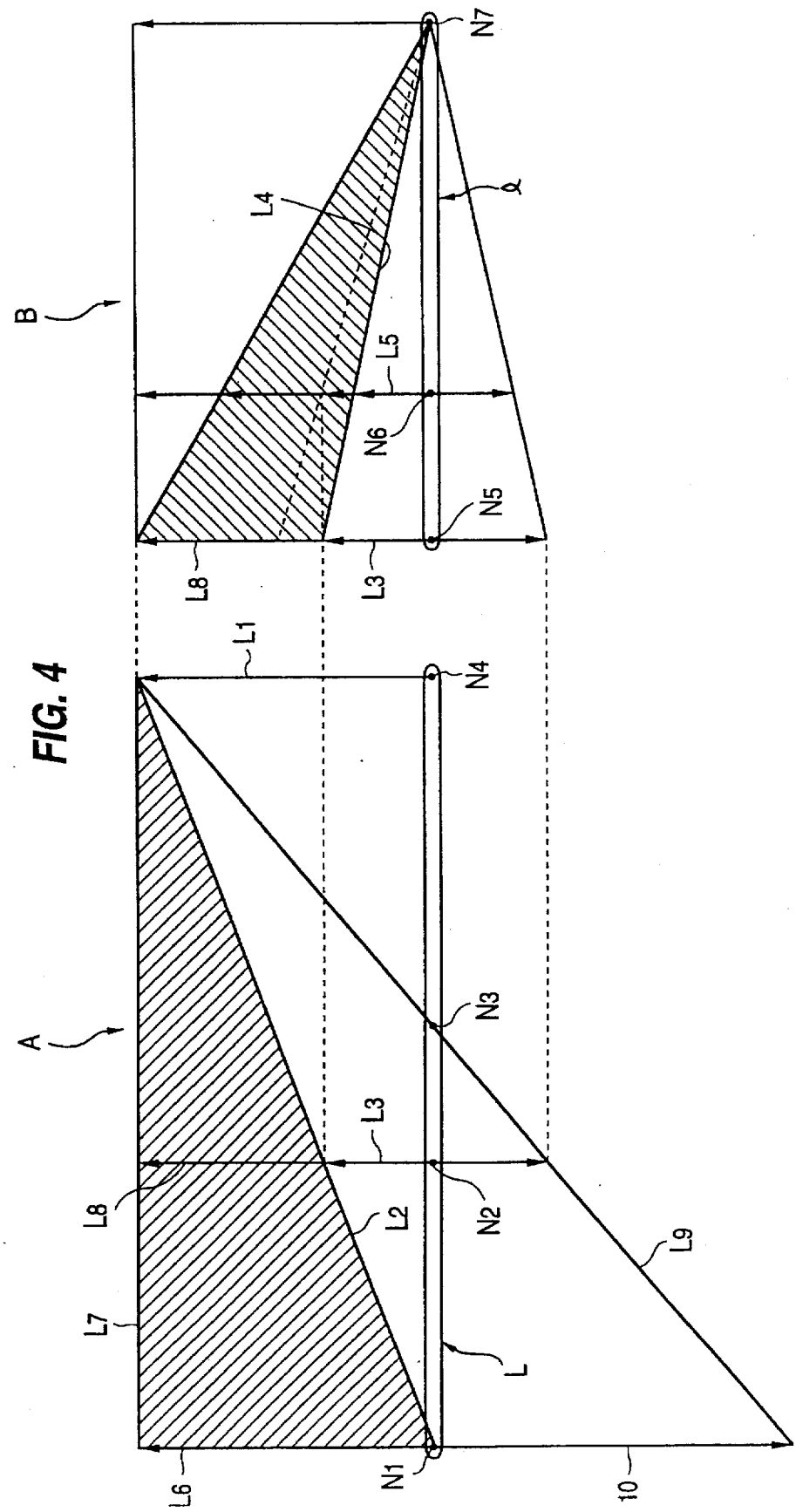
FIG. 4 is a graph illustrating speed ratio of the automatic transmission in accordance with the present invention by a lever analogy method.

To illustrate the above operation with lever analysis method, as shown in FIG. 4, the left end of the lever L where the first sun gear 18 and the second ring 26 are positioned can be designated as the first node N1, the adjacent position of the first node N1 where the first power transmission member 20 and the fourth power transmission member 32 are positioned can be designated as the second node N2, the middle portion of the lever L where the first ring gear 12 is positioned can be designated as the third node N3, and the right end of the lever L where the second sun gear 24 is positioned can be designated as the fourth node N4.

Therefore, when the manual shift lever L is shifted to the "D" speed range, the fourth node N4 functions as the input end and the first node N1 functions as the static end, at this situation a straight line L2 can be formed from any point on the input speed line L1 of the fourth node N4 to the first node N1. And a straight line L3 can be drawn from the second line L2 to the line L, wherein line L3 is to be an output speed line.

At this situation, a speed ratio of the transmission is expressed by the input speed line L1/the output speed line L3. This ratio becomes the first speed changing ratio in the "D" range.

The power changed to the first speed level is transferred to the transfer driving gear 38 through the fourth power transmission member 32, and then transferred to the sixth power transmission member 42 of the second transmission part B through the transfer driven gear 40 which is meshed with the transfer driving gear 38.

In this procedure, the revolution speed of power transferred to the transfer driven gear 40 is reduced, increased or equal with the speed of the transfer driving gear 38 according to the difference in number between the teeth of the transfer driving gear 38 and the teeth of the transfer driven gear 40, and transferred to the third sun gear 44. And then the power transmitted to the third sun gear 44 is transferred to the third ring gear 48 through the third pinion gear 46, therefore the third ring gear 48 tends to rotate in a clockwise direction when viewing from the engine E side. The rotation of the third ring gear 48 is restricted, since the second one-way clutch F2 locks the third ring gear 48 against rotation.

Therefore, since in the second transmission part B the third ring gear 48 functions as a reaction member, and the third sun gear 44 functions as an input member. The planet carrier 50 connected with the second shaft 54 is operated as an output member.

As shown in FIG. 4, nodes can be established in the lever L of the second transmission part B. The left end of the lever positioned at the third sun gear 44 can be designated as the fifth node N5, the adjacent part of the fifth node N5 positioned the planet carrier 50 can be designated as the sixth node N6, and the right end of the lever L positioned the third ring gear 48 can be designated as the seventh node N7.

The number of revolutions inputted into the fifth node N5 is the output speed of the first transmission part A and can be designated as the speed line L3 in the fifth node N5. The output speed of the second transmission part B can be designated as the line L5 which vertically connects the sixth node N6 with the line L4 formed by the connection between the speed line L3 and the node N7. The output speed designated as the line L5 is to be the final speed changing ratio of the automatic transmission according to the present invention.

The final speed outputted from the planet carrier 50 is transferred to the final driving gear 56 through the second shaft 54, and then the power of the final driving gear 56 is transferred through the final reduction gear 58 to the differential gear D so that the axle 60 of a car is driven.

As described above, in the first changing speed in the "D" range, the total speed changing ratio can be expressed as follows: speed reduction ratio—the ratio of the transfer drive gear 38 and the transfer driven gear 40—the reduction ratio of the single planet gear 4.

In this state of the first changing speed, since the second one-way clutch F2 in the second speed changing part B is to be idle by the reaction force in a reverse direction, the operation of the engine is not braked when the vehicle is running with the force of inertia. In a manual mode, however, the third brake B3 is operated and the transmission of the engine power is braked.

In the first fixing mode, when the speed of the stator S reaches the range of predetermined speed or the state that the torque converter TC is coupled, the control unit of the transmission operates the second clutch C2. As a result, the stator S and the fourth power transmission member 32 are directly connected to each other.

Then at this time, since the fourth power transmission member 32 outputs the first fixing mode and the stator S increases the torque, the revolution speed of the transfer drive gear 38 is more increased than the revolution speed of the first fixing mode.

Figure 2:
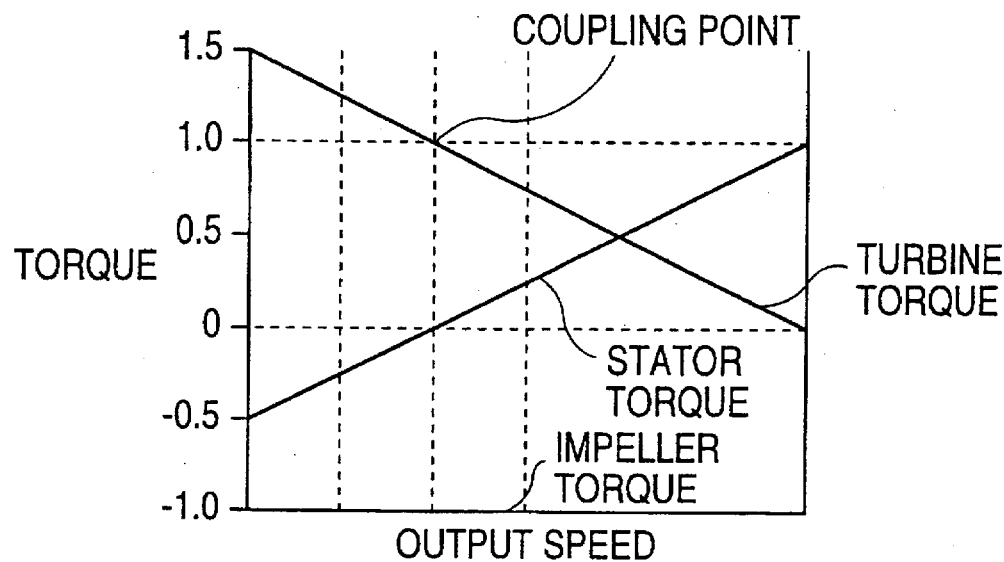
FIG. 2 is a graph showing a relationship between the torque from coupling point, turbine, stator and impeller and the same members.
Figure 3:
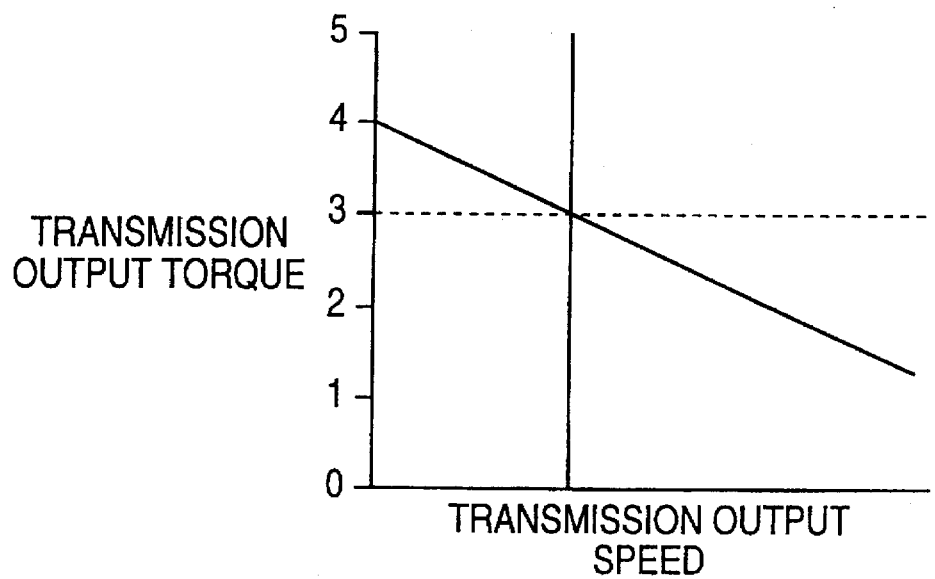
FIG. 3 is a graph showing a relationship between the output torque of the transmission and the output speed of the transmission.

Therefore, the torque of the turbine T is decreased as much as the torque transferred to the transfer drive gear 38 through the stator S. This state is a continuous speed changing state shown in FIG. 2 and FIG. 3 which represents the relation between the output speed and torque prior to being shifted up to the second speed level. That is, the continuous speed changing level is started from the time when the torque of the stator S is transferred to the transfer drive gear 38. At this time the torque of the impeller I is constant, but the torque of the turbine is decreased and the torque of the stator S is increased.

As the output speed of the transmission is increased, the torque ratio of the transmission is decreased. The speed is continuously changed until the torque converter TC reaches a coupling state again. Then the ratio of the speed changing is determined according to the load applied to the vehicle.

When the load applied to the vehicle is low, the time which is needed to reach the direct coupling mode of the second speed is short. On the contrary, when the load applied to the vehicle is high, the time when the torque converter reaches the coupling state is long, then the operating time in the low speed range is long.

If substantial kickdown is performed in the above mode, the engagement of the fourth clutch C2 is released and the torque transferred from the stator S to the fourth power transmission member 32 is cut off. The speed is instantaneously changed to the fixing mode of the first speed level, and the torque is increased.

If only a small amount of kickdown is performed in the above mode, the engagement between the stator S and the fourth power transmission member 32 is maintained, the torque of the reverse direction at a stall is applied to the stator S. The speed of the stator is decreased and the torque of the turbine is increased. The total output torque is increased and the effect of the kickdown can be attained.

During the above operation, shock upon changing the speed does not occur. As the second clutch C2 is operated or not operated, however, some shock can occur at the moment the stator S is connected or disconnected with the fourth power transmission member 32. Since the stator S is positioned in the torque TC, the shock is absorbed by the torque TC which functions as a damper.

As illustrated in the above, when the speed is automatically and continuously changed, the total speed changing ratio can be described as follows: the ratio of continuous reduction speed in the multiplanet gear device—the speed changing ratio of the transfer drive gear and transfer driven gear—the speed reduction ratio of the single planet gear device. On this operation, when the vehicle is running with the force of inertia, engine braking is not performed.

In the above mode of automatic continuous speed changing, the speed of the vehicle is continuously increased, and the revolution speed of the stator S reaches a certain speed or the torque TC is in a coupling state. The first brake B1 is released and the first clutch C1 is operated by the control unit of the transmission according to the present invention.

The output of the engine is transmitted to the first shaft 8 through the first clutch C1 and transmitted to the first ring gear 12 of the multiplanet gear device 2. The output of the engine is also simultaneously transmitted to the second sun gear 24 through the third power transmitting member 30. Then the multiplanet gear device 2 has two input members.

Accordingly, as shown in FIG. 4, since the first node N1 and the fourth node N4 in the first speed changing part A are to be input nodes, the line L8 which connects the line L7 formed by connection between the input speed line L1 and the input speed line L6 with the second node N2 is to be the final output line L8 in the first speed changing part A.

That is, the multiplanet gear device 2 is directly connected with the torque converter TC, and the second speed is outputted. Speed reduction is performed in the second speed changing part B like in the fixing mode of first speed level.

At this time, as shown in Table 6, since the first clutch C1 is operated, the multiplanet gear device 2 is directly connected with the engine E, and high efficiency of the power transmission can be attained. Since the second clutch C2 is not operated, the stator is idle. The loss of power in the torque converter is zero.

Since the speed changing is performed in the state that the difference between the speed of the turbine T and the first ring gear 12 just prior to speed changing is zero or very little, the shock for speed changing is minimized.

The vibration transferred from the engine E is absorbed by the damper 36 equipped on the hub 14.

The total ratio in the fixing mode of the advanced second speed level is as follows: the direct connection of the multiplanet gear device—the ratio of speed changing in the transfer drive gear and the transfer driven gear—the ratio of reduction in the single planet gear device 4.

If the speed of the vehicle is increased, the second clutch C2 of the first speed changing part A is additionally operated and the third clutch C3 of the second speed changing part B is operated by the control unit of the transmission in accordance with the present invention. Then, since the first speed changing part A and the second speed changing part B are directly connected to each other, the third speed level is outputted.

As shown in FIG. 4, the output speed of the first speed changing part A designated as the line L8 is inputted into the second speed changing part B and directly outputted without changing of speed.

At this time, since the engine E is directly connected with the torque converter TC and all of the elements in the first and the second speed changing part A/B are connected to each other, the maximum efficiency of the power transmission can be obtained. The engine brake is not operated when the vehicle is running with inertia force. The shock for speed changing is only slight because the speed changing is performed under the low torque of the engine E.

Referring to FIG. 6, in the second speed of the III range, engine braking is performed, because the second clutch C2 and the third brake B3 are engaged in the second speed of the III range.

Furthermore, in the automatic continuous mode of the II range, engine braking is also performed when the vehicle is running with the inertia force, because the second clutch C2 and the brake B2 are operated.

In the L range, the engine brake is operated when the vehicle is running with the force of inertia. At this time, the engine braking is performed by the action of the first brake B1 and the third brake B3 in the first speed changing part A being operated and the first sun gear 18 being locked.

Figure 5:
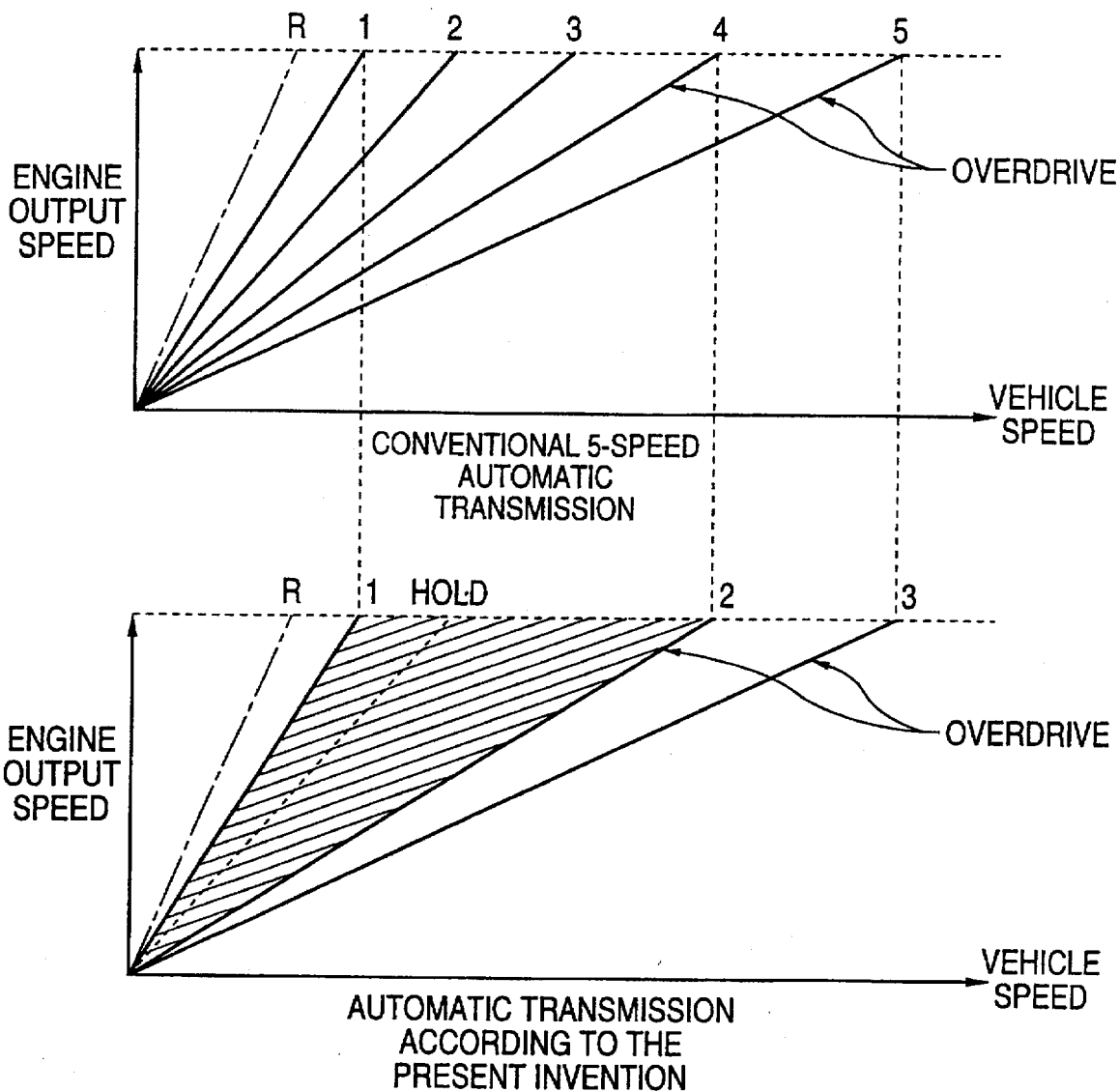
FIG. 5 is a graph comparing a prior automatic transmission with the automatic transmission in accordance with the present invention in distribution of the rate of speed.

The above description is related to the process of speed changing in advance running. As shown in FIG. 5, the first speed changing ratio in accordance with the present invention is the same as that of the first speed changing ratio in the prior automatic transmission having five speed changing levels. In the automatic continuous speed changing level, the speed is continuously changed until the speed reaches the fourth speed changing level in the prior automatic transmission. Therefore, the shock upon changing speed will not occur in the low speed range in which much shock for changing speed will normally occur.

A select lever of the automatic transmission is moved to the "R" range, the second brake B2 in the first speed changing part A is operated and the third brake B3 in the second speed changing part B is operated, respectively, by the control unit of the transmission. As a result, the second sun gear 24 of the multiplanet gear device 2 becomes the input element and the first ring gear 12 becomes the reaction element, and the fourth power transmission element is an output element.

Then as shown in FIG. 4, the line L10 which connects the line L9 formed by connection between the third node N3 and the input line L1 inputted into the fourth node N4 with the first node N1 is to be the reduction ratio in the reverse running.

The reduction ratio is performed by the gear ratio between the transfer drive gear 38 and the transfer driven gear 40. The reduced speed is again reduced by the reaction member of the third ring gear 48 and transferred to the differential mechanism D.

If necessary, a "hold" function occurs in the second speed when the vehicle is running on the slippery road and slippage occurs between the tire of the vehicle and the road. The second brake B2 and the third clutch C3 are operated by the control unit of the transmission in accordance with the present invention, and the first speed level is performed in the first speed changing part A. The single planet gear device 4 in the second speed changing part B becomes a direct connection state. As shown in FIG. 4, a new ratio of speed changing is formed between the first speed level and the second speel level in the second speed changing part B.

In this procedure, engine braking is performed when the vehicle is running with the force of inertia. This mode can also be used in the II range.

As described in the above, and as shown in FIG. 6, each element and member in the multiplanet gear device 2 and the single planet gear device 4 are operated. In the table, "0" designates an operating member, and "x" designates a nonoperating member.

The advantages of the present invention are as follows:

1) The time required for changing speed is short, and since speed changing is continuously performed in a low speed level, the shock for speed changing is nearly negligible.

2) Since the speed changing device is directly connected with the torque converter TC in the high speed level in which the shock for speed changing is not high but the operation time is long during the time the vehicle is running in order to increase the fuel efficiency, the increasing of the fuel efficiency can be maximized.

3) As compared with the prior automatic transmission applied one-way clutch in an entire speed changing range, the power train in accordance with the present invention can increase the feeling that a change of speed is smooth. The weight of the power train is right and the cost of the train can be lowered.

Figure 7:
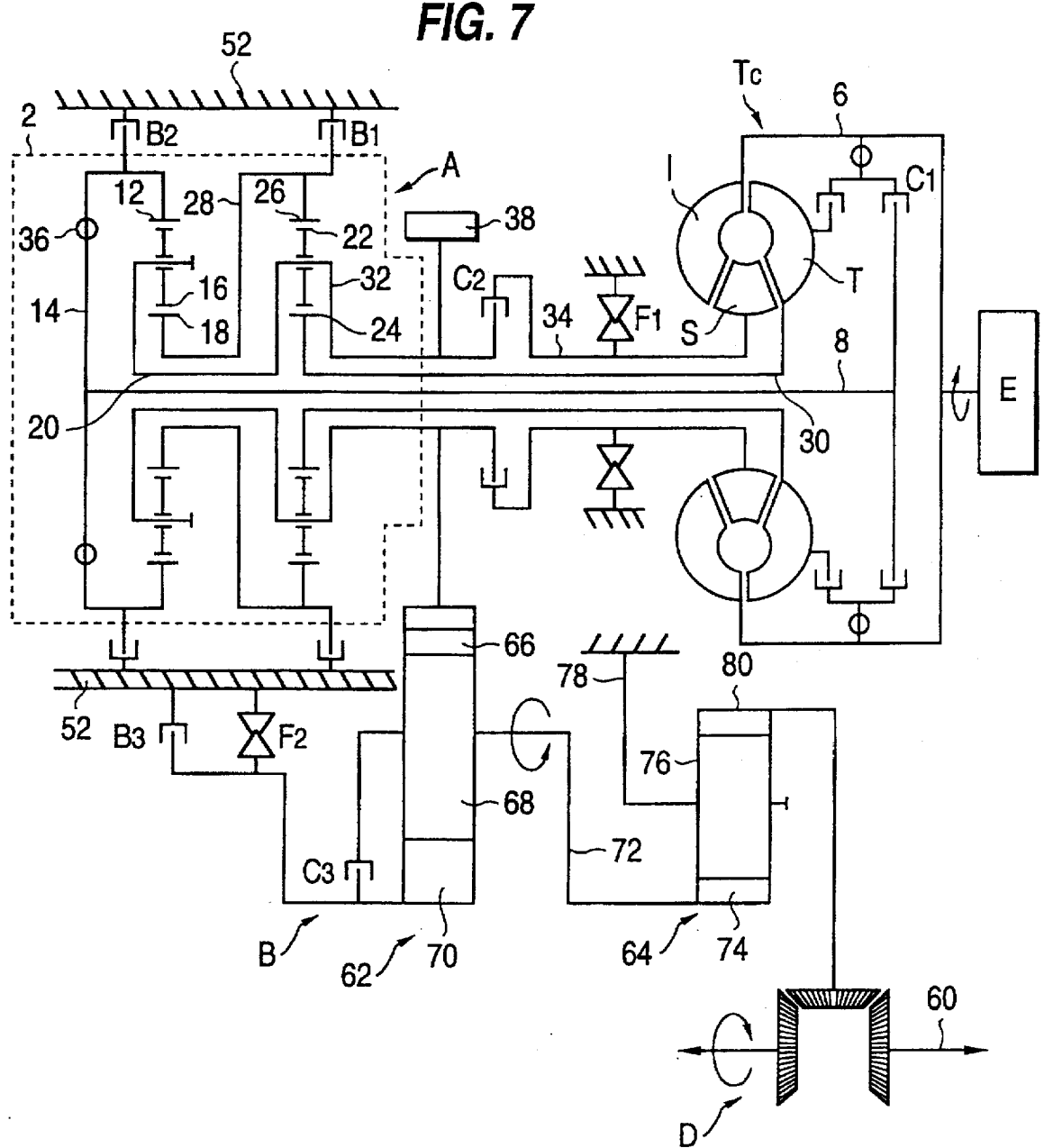
FIG. 7 is a schematic illustration of the automatic transmission in accordance with the second embodiment of the present invention.

FIG. 7 shows the second embodiment of the present invention. The first speed changing part A of this embodiment is the same as that of the first embodiment described above, and the second speed changing part B is different from that of the first embodiment.

The second speed changing part B is comprised of a first single planet gear device 62 which receives power from the transfer drive gear 38 of the first speed changing part A, and the second single planet gear device 64 which receives power from the first single planet gear device 62.

The first single planet gear device 62 is comprised of a ring gear 66 meshed with the transfer gear 38 to transfer power between the gears 66 and 38, a plurality of first pinion gears 68 engaged with the inside of the first ring gear 66, and the first sun gear 70 engaged with the plurality of first pinion gears 68, respectively.

The first sun gear 70 is connected with the several pinion gears 68 through the clutch C3 and the pinion gears 68 and the first sun gear 70 can be simultaneously rotated when the clutch C3 is operated. The first sun gear 70 can function as a reaction member by the operation of the brake B3 installed on the inner surface of the transmission case 52.

Furthermore, a one-way clutch F2 is installed between the transmission case 52 and the sun gear 70, therefore the sun gear 70 cannot be rotated in the clockwise direction by the operation of the one-way clutch F2 which functions as a reaction member.

The output of the pinion gears 68 is transferred to a second sun gear 74 of the second single gear device 64 through the planet carrier 72 which is connected with the pinion gears 68, respectively.

A plurality of second pinion gears 76 are meshed with the second sun gear 74, and the second pinion gears 76 are fixed with a carrier 78 mounted on the transmission case 52 so that the second pinion gears 76 are to be rotated on its axis. A second ring gear 80 is internally meshed with the second pinion gears 76.

According to the construction of the second embodiment in accordance with the present invention, the second ring gear 80 is reversely rotated against the rotating direction of the planet carrier 72. The second single planet gear device 64 substantially increases or decreases the speed, and the finally controlled power is outputted to the differential gear 60 and rotates the axle of the vehicle.

The operation of the power train according to this embodiment is the same as that of the first embodiment of the present invention. In the first speed level, the continuous speed level and the second speed level, the rotation of the first sun gear 70 is locked by the second one-way clutch, and in the third speed level the clutch C3 is operated and the first single planet gear device 62 is integrally rotated.

In backward running of the vehicle, the brake B3 is operated and the reverse rotation of the first sun gear 70 to the rotation of the engine E is locked, such that the first sun gear 70 becomes a reaction member and the output speed is reduced.

Figure 8:
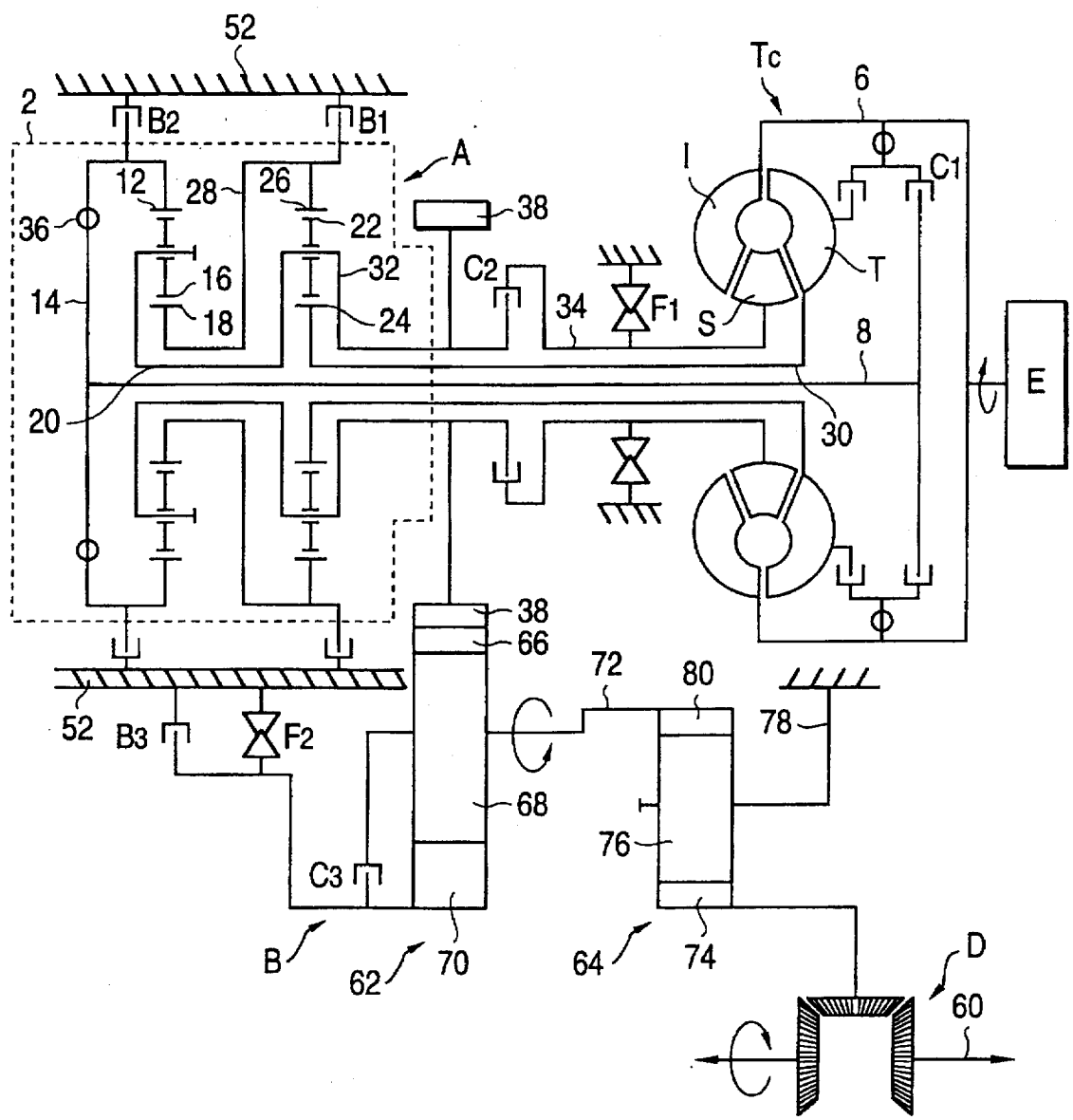
FIG. 8 is a schematic illustration of the automatic transmission in accordance with the third embodiment of the present invention.

FIG. 8 shows the third embodiment of the present invention. In this embodiment, the second speed changing part B is composed of two single planet gear devices like the second embodiment described above.

The difference between the third embodiment and the second embodiment is that the planet carrier 72 of the first single planet gear device 62 is connected with the second ring gear 80 of the second single planet gear device 64, the planet carrier 78 is directly mounted on the transmission case 52 and functions as a reaction member, and the second sun gear 74 becomes an output member.

The operation of the third embodiment is the same as that of the first and the second embodiment.

Figure 9:
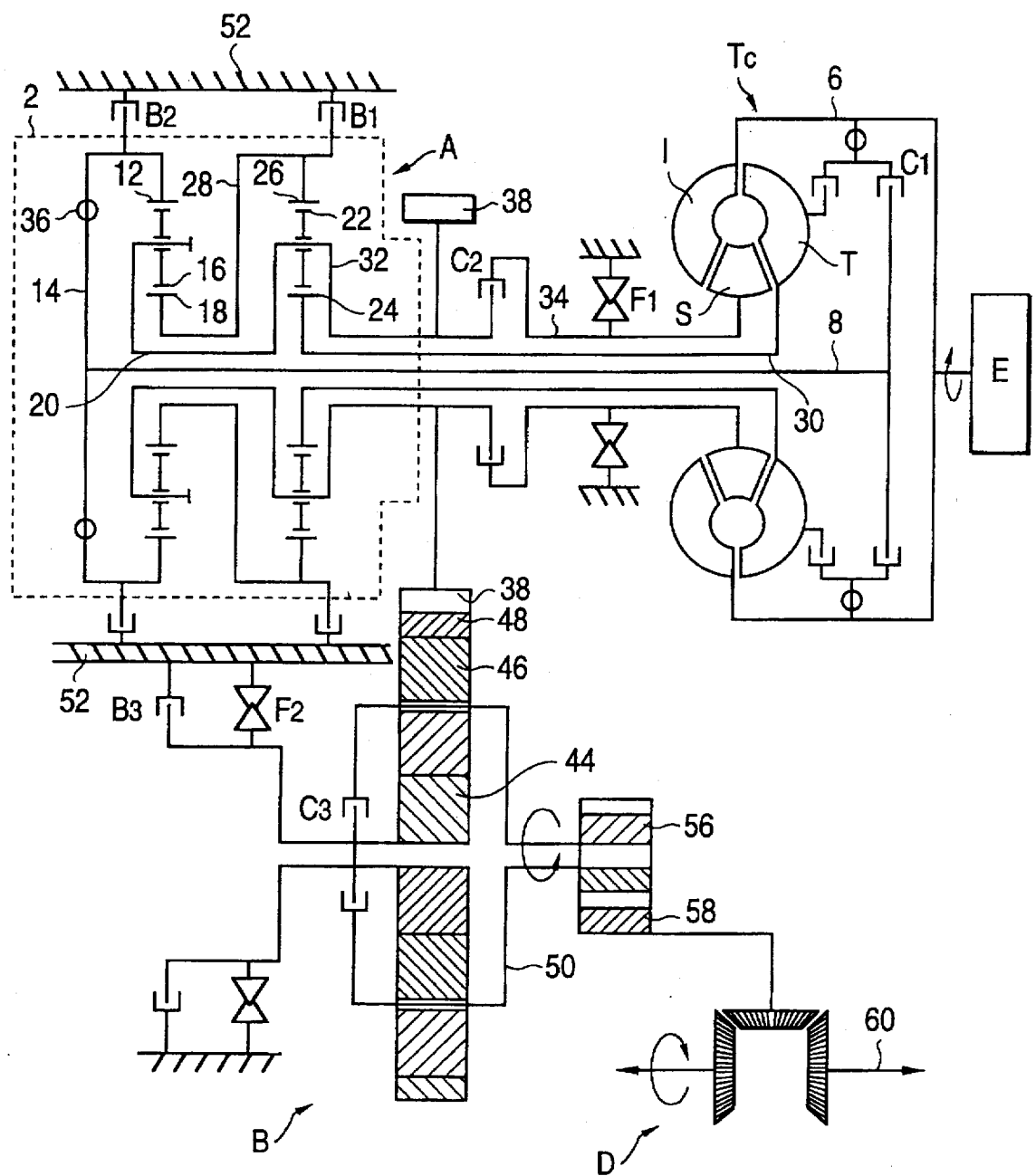
FIG. 9 is a schematic illustration of the automatic transmission in accordance with the fourth embodiment of the present invention.

FIG. 9 shows the fourth embodiment of the power train according to the present invention. The first speed changing part A of this embodiment is the same as that of the first embodiment, and the second speed changing part B of this embodiment is composed of one single planet gear device like the second speed changing part B of the first embodiment.

The difference between the third embodiment and the first embodiment is that in the third embodiment, the power from the first speed changing part is directly transferred to the ring gear 48 of the single planet gear device 4.

A plurality of the pinion ring gears 46 meshed with the third ring gear 48 are arranged around the third sun gear 44. The clockwise rotation of the third sun gear 44 is locked by the second one-way clutch F2 and the counterclockwise rotation of the third sun gear 44 is selectively locked by the brake B3.

Moreover, the final driving gear 56 is installed on an end of the planet carrier 50 which is connected with the third pinion gears 46. The final reduction gear 58 is meshed with the final driving gear 56 and the driving direction of the power can be changed to the same direction as that of the engine.

The operation of the fourth embodiment according to the present invention is the same as that of other embodiments. It is preferred that the final driving gear 56 and the final reduction gear 58 consist of a helical gear to reduce the noise and the vibration which may occur in a high speed level.

Figure 10:
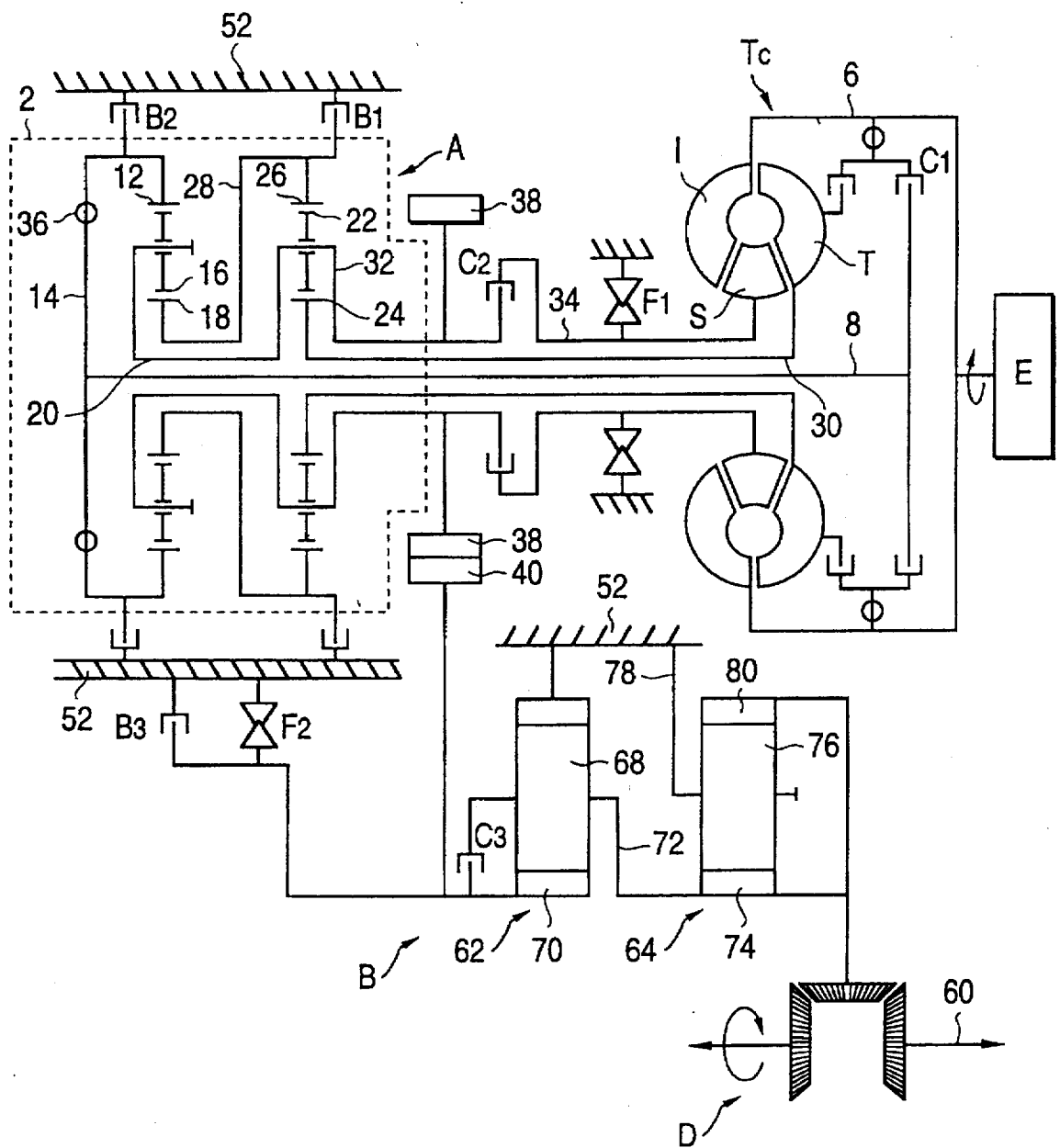
FIG. 10 is a schematic illustration of the automatic transmission in accordance with the fifth embodiment of the present invention.

FIG. 10 shows the fifth embodiment according to the present invention. The power train of the fifth embodiment uses two single planet gears like the second and the third embodiment. The input of the second speed changing part B is performed by the transfer driven gear 40 like the first embodiment.

The transfer driven gear 40 is connected with the sun gear 70 of the first single planet device 62 and selectively connected with the first pinion gear 68 through the clutch C3. Therefore, the first single planet gear device 62 has two input elements.

The first ring gear 66 is fixed to the case 52 and functions as a reaction member. The planet carrier 72 which functions as an output member is connected with the sun gear 74 of the second single planet gear device 64 to transfer the power.

The planet carrier 78 of the second single planet gear device 64 is fixed on the transmission case 52 and functions as a reaction member. The second ring gear 80 is connected with the differential gear D which outputs the finally controlled speed.

The fifth embodiment of the present invention is the same as that of other embodiments in its operation. The only difference between the fifth embodiment and other embodiments is that the first ring gear 66 functions as a reaction member.

Figure 11:
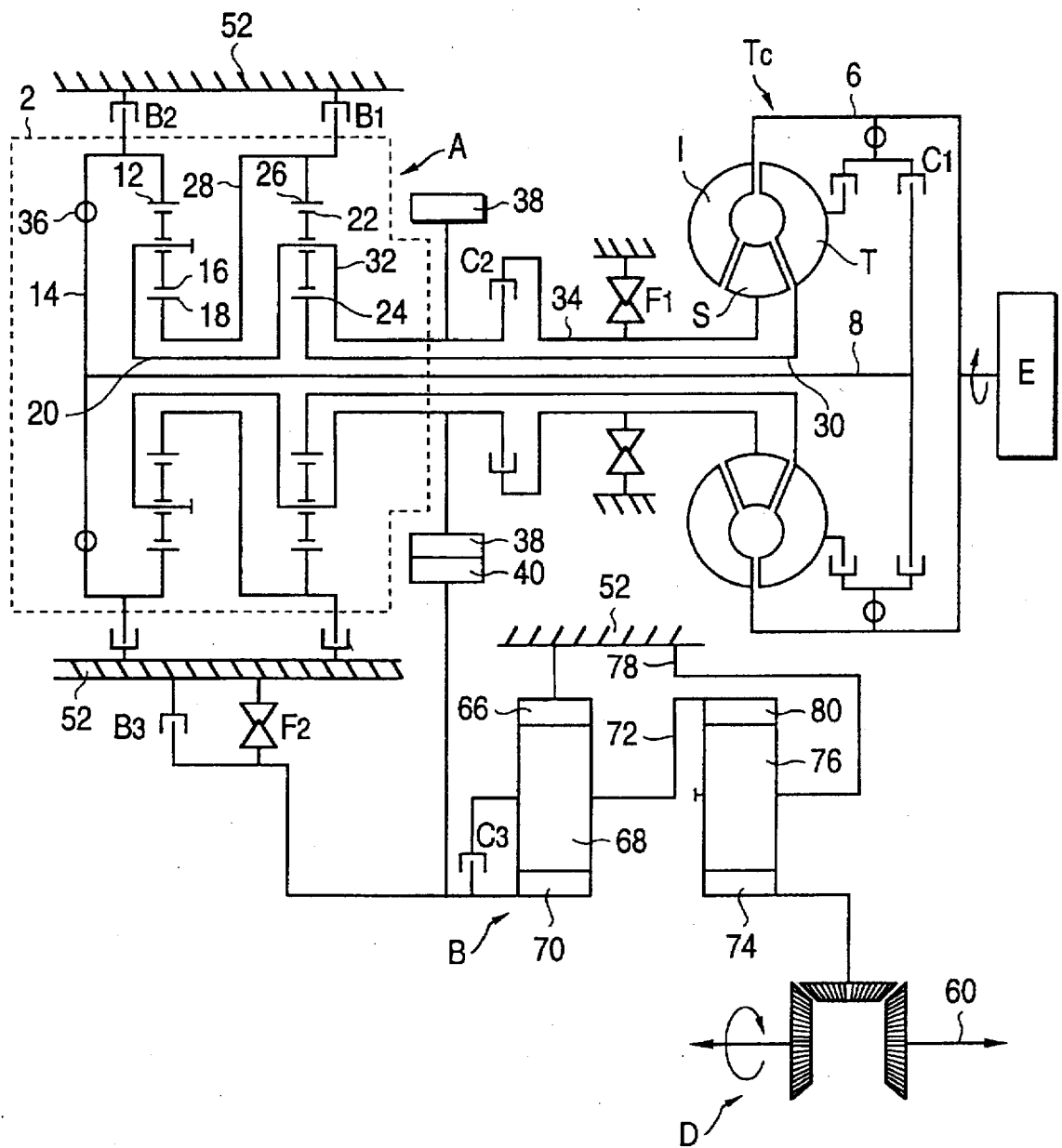
FIG. 11 is a schematic illustration of the automatic transmission in accordance with the sixth embodiment of the present invention.

FIG. 11 shows the sixth embodiment according to the present invention. This embodiment is designed to transfer the power through the transfer driven gear 40 of the second speed changing part B and uses two single planet gear devices like the fifth embodiment of the present invention.

The difference between the sixth embodiment and other embodiments is that the first ring gear 66 of the first single planet gear device 62 is fixed on the transmission case 52 and functions as a reaction member, and the planet carrier 72 is connected with the second ring gear 80 of the second single planet gear device 64. A second sun gear 74 is connected with the differential gear D. The operation of the embodiment is the same as that of the other embodiments.

Figure 12:
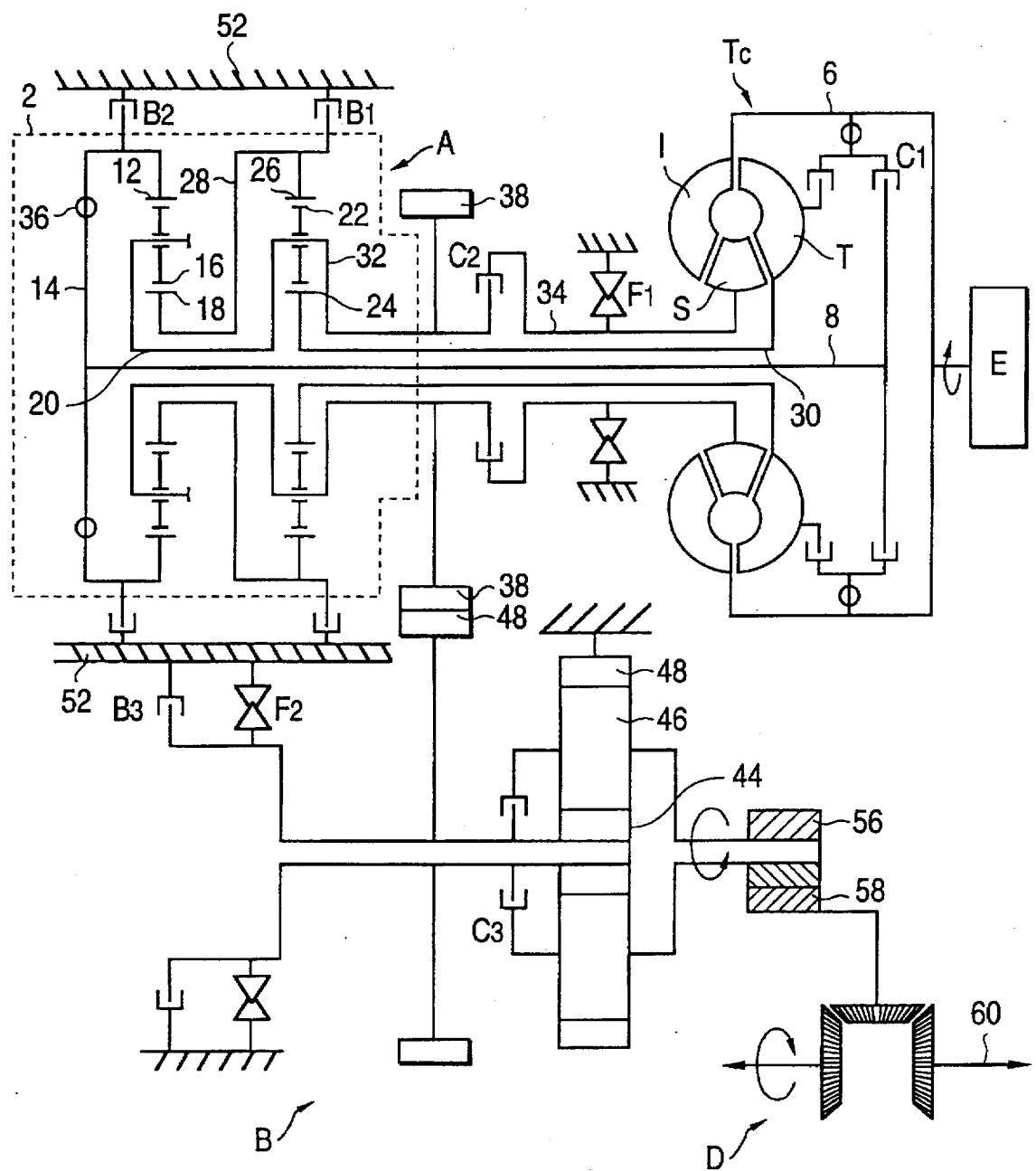
FIG. 12 is a schematic illustration of the automatic transmission in accordance with the seventh embodiment of the present invention.

FIG. 12 shows the seventh embodiment according to the present invention. The second speed changing part of this embodiment uses a single planet gear device like the power train of the fourth embodiment. The difference between this embodiment and other embodiments is that the transfer driven gear 40 is used as an input member of the second speed changing part. The third ring gear of the single planet device in the fourth embodiment is used as an input member, and the third ring gear in the seventh embodiment is used as a reaction member.

The power train according to the seventh embodiment is also operated like the other embodiments described above.

What is claimed is:

1. A power train of an automatic transmission, comprising:
    a torque converter having an impeller, a turbine and a stator; and
    first speed changing means for selectively converting an output speed of said torque converter according to at least one of a first and second speed ratio, said first speed changing means including a multiplanet gear device having planetary gear members, and a clutch selectively connecting said stator of said torque converter to one of said planetary gear members of said multiplanet gear device to continuously vary said converting of said output speed of said torque converter between said first and second speed ratios.

2. The power train according to claim 1, wherein a damper is installed on an input end of the multiplanet gear device to reduce shock when the multiplanet gear device is directly connected with an engine connected to the torque converter.

3. The power train of claim 1, further comprising:
    second speed changing means for selectively converting an output speed of said first speed changing means according to at least a third speed ratio.

4. The power train according to claim 3, wherein the multiplanet gear device includes a first ring gear which functions as an input element by a first clutch selectively connected with a turbine of said torque converter, a plurality of first pinion gears meshed with the inside of the first ring gear, a first sun gear meshed with first pinion gears around the first sun gear, a second pinion gear connected with the first pinion gears through a first power transmitting member, a second ring gear connected with the second pinion gear and connected with the first sun gear through a second power transmitting member, and a second sun gear meshed with the second pinion gear and connected with a turbine of the torque converter through a third power transmitting member.

5. The power train according to claim 4, further comprising:
    a first brake connected to said second ring gear and said first sun gear; and
    a second brake connected to said first ring gear.

6. The power train of claim 4, wherein a clutch selectively connects said second pinion gear with a stator of said torque converter.

7. The power train according to claim 4, wherein said second speed changing means includes at least one single planet gear device, and said at least one single planet gear device includes a third sun gear connected with a transfer driven gear which is meshed with a transfer drive gear of the multiplanet gear device, a plurality of third pinion gears meshed with said third sun gear, and a third ring gear meshed with the plurality of third pinion gears.

8. The power train according to claim 7, wherein a fourth power transmitting member connects the second pinion gear with the transfer drive gear.

9. The power train according to claim 3, wherein said second speed changing means includes at least one single planet gear device.

10. The power train according to claim 9, wherein said at least one single planet gear device includes a sun gear connected with a transfer driven gear which is meshed with a transfer drive gear of the multiplanet gear device, a plurality of pinion gears meshed with a said sun gear, and a ring gear meshed with the plurality of pinion gears.

11. The power train according to claim 10, wherein the transfer driven gear is connected with the plurality of third pinion gears through said at least one single planet gear device.

12. The power train according to claim 10, wherein when the sun gear of the single planet gear device in the second speed changing means functions as an input element, said second speed changing means reduces an output speed of said first speed changing means, and when both of a planet carrier connected to said plurality of pinion gears and the sun gears functions as an input element, an output speed of said second speed changing means substantially equals an output speed of said first speed changing means.

13. The power train according to claim 9, wherein the multiplanet gear device and the at least one single planet gear device are mounted on separate shafts, respectively.

14. The power train according to claim 3, wherein
    said second speed changing means includes a first single planet gear device and a second single planet gear device, said first single planet gear device selectively decreases or directly transfers said output speed of said first changing means;
    said first single planet gear device includes a sun gear, pinion gears connected to said sun gear, a planet carrier connected to said pinion gears, and a ring gear connected to said pinion gears; and said second single planet gear device at least one of decreases or increases an output speed of said first single planet gear device and changes a rotary direction of said planet carrier of said first single planet gear device into a same rotary direction as an output shaft of an engine connected to said torque converter, said second single planet gear device includes a sun gear, pinion gears connected to said sun gear, a planet carrier connected to said pinion gears, and a ring gear connected to said pinion gears.

15. The power train according to claim 14, wherein the ring gear of the second single planet gear device functions as an input element, the planet carrier of the second single planet gear device functions as a reaction element, and the sun gear of the second single planet gear device functions as an output element.

16. The power train according to claim 14, wherein the ring gear of the first single planet gear device functions as a reaction element, the sun gear of the first single planet gear device functions as an input element, and the planet carrier of the first single planet gear device functions as an output element.

17. The power train according to claim 14, wherein the sun gear of the second single planet gear device functions as an input element, the planet carrier of the second single planet gear device functions as a reaction element, and the ring gear of the second single planet gear device functions as an output element.

18. The power train according to claim 14, wherein the sun gear of the first single planet gear device functions as a reaction element, the planet carrier of the first single planet gear device functions as an output element, and the ring gear functions as an input element.

* * * * *